United States Patent [19]

Maruyama

[11] Patent Number: 4,848,883
[45] Date of Patent: Jul. 18, 1989

[54] TELEPHOTO ZOOM LENS SYSTEM HAVING FOUR LENS GROUPS

[75] Inventor: Koichi Maruyama, Tokyo, Japan

[73] Assignee: Asahi Kogaku Kogyo Kabushiki Kaisha, Tokyo, Japan

[21] Appl. No.: 150,950

[22] Filed: Feb. 1, 1988

[30] Foreign Application Priority Data

Jan. 30, 1987 [JP] Japan .................................. 62-20204

[51] Int. Cl.$^4$ ............................................ G02B 15/14
[52] U.S. Cl. .................................................. 350/427
[58] Field of Search ................................. 350/423, 427

[56] References Cited

U.S. PATENT DOCUMENTS 4,752,121 6/1988 Kitagishi .............................. 350/427

Primary Examiner—Bruce Y. Arnold
Assistant Examiner—Scott J. Sugarman
Attorney, Agent, or Firm—Sughrue, Mion, Zinn, Macpeak & Seas

[57] ABSTRACT

A four-group type telephoto lens system including a super-telephoto range having a viewing angle (2ω) of less than 8° and which includes a focusing lens in a first lens group. The lens system includes for lens groups. The first group is composed of a first sub-part having a positive refractive power, a second sub-group having a negative refractive power, and a third sub-group having a positive refractive power. The second group has a negative refractive power, the third group a positive refractive power, and the fourth group a positive refractive power. Zooming is effected by moving the second group, while focusing is carried out by moving only the third sub-group of the first group.

3 Claims, 10 Drawing Sheets

TELEPHOTO ZOOM LENS SYSTEM HAVING FOUR LENS GROUPS

BACKGROUND OF THE INVENTION

The present invention relates to a four-group type zoom lens system including a super-telephoto range having a view angle (2ω) of smaller than 8° at the telephoto end. More particularly, the present invention relates to a telephoto zoom lens system including a focusing lens unit in the first lens group.

Zoom lenses commonly achieve focusing by moving the front lens group. This method has the advantage of providing for zooming in the substantial absence of defocusing and with only fairly small aberrational changes.

However, in the case of a zoom lens system that has a very long focal distance at the telephoto end and which has a large effective aperture, focusing by moving the front lens group results in certain inconveniences in handling compared with a super-telephoto lens system with a fixed focal length that employs an inner focusing method. That is, such a lens system is heavy, resulting in undue variations in weight balance and necessitating the use of a heavy focusing ring.

Focusing by moving the front-group is also unsuitable for use in an auto focusing (AF) system in which the focusing lens unit is moved with a motor because, first, the movable lens has a large effective aperture and is heavy and, secondly, any accessories mounted on the lens, such as a filter and a hood, must also be moved during focusing.

While many zoom lens systems have been known employing inner focusing method, those which are capable of achieving zooming at a desired length without defocusing are roughly divided into the following two types: (1) a system of the type shown in Unexamined Published Japanese Patent Application No. 14591/1976 which employs simultaneous movement of two or more lens groups with their relative position being varied during zooming; and (2) a system of the type shown in Japanese Patent Publication No. 4688/1984 in which a part of the lens group closer to the object is moved during focusing than the lens group that is moved during zooming.

The former type of lens system, which employs a complex lens barrel composition, has the disadvantage that it tends to experience not only deterioration of lens performance due to decentering of adjacent lens groups but also has a high weight of the components that have to be moved for zooming. The latter type of lens system, which has a smaller number of moving lens elements and thus achieves a weight reduction, suffers from the disadvantage that it has great variations in chromatic and spherical aberrations during zooming.

SUMMARY OF THE INVENTION

An object, therefore, of the present invention is to solve the aforementioned problems of the prior art and to provide a telephoto zoom lens system including a super-telephoto range that operates with a simple zooming and focusing mechanism and which maintains a good optical performance over a wide range of focal lengths, inclusive of the closest focusing distance.

A telephoto zoom lens system of the present invention which is capable of attaining the above and other objects comprises four lens groups including in order from the object side, of a first group having a positive refractive power and being composed of a first sub-part I-1 having a positive refractive power, a second sub-group I-2 having a negative refractive power, and a third sub-group I-3 having a positive refractive power, the second group having a negative refractive power, the third group having a positive refractive power, and the fourth group having a positive refractive power. This lens system achieves zooming by moving the second lens group, which is chiefly responsible for varying magnification, and the third lens group, which has an image position correcting capability, along the optical axis. The system achieves focusing when photographing an object at a finite distance by moving only the sub-group I-3 toward the object side. This lens system further satisfies the following conditions:

(1) $0.08 < d_{(I\text{-}1, I\text{-}2)}/f_L < 0.16$;
(2) $0.5 < h_{I\text{-}2}/h_{I\text{-}1} < 0.8$; and
(3) $0.3 < f_L/f_{(I\text{-}1, I\text{-}2)} < 1.0$ where $f_L$: focal length of the overall system at the narrow-angle end;

$d_{(I\text{-}1, I\text{-}2)}$: distance between sub-part I-1 and sub-group I-2;

$h_{I\text{-}1}$: height of paraxial rays from an object at infinity to the sub-part I-1 paraxially at an incident angle of 0°;

$h_{I\text{-}2}$: height of the paraxial rays from an object at infinity to the sub-group I-2 paraxially; and $f_{(I\text{-}1, I\text{-}2)}$: composite focal length of the sub-part I-1 and sub-group I-2.

This lens composition enables the effective aperture of the focusing lens unit (sub-group I-3) to be reduced to 0.7 times the diameter of the front lens group and less.

In a preferred embodiment of the zoom lens system of the present invention, the sub-group I-3 has at least one positive lens element and at least one negative lens element and satisfies the following condition:

$$\nu_{(I\text{-}3\text{-}N)} - \nu_{(I\text{-}3\text{-}P)} < -40 \tag{4}$$

where $\nu_{(I\text{-}3\text{-}N)}$: average of the Abbé numbers of the negative lens elements in the sub-group I-3; and $\nu_{(I\text{-}3\text{-}P)}$: average of the Abbé numbers of the positive lens elements in the sub-group I-3.

In another preferred embodiment of the present invention, the sub-group I-2 is composed of one negative lens element having a concave surface on the object side and one positive lens element and satisfies the following condition:

$$5 < \nu_{(I\text{-}2\text{-}N)} - \nu_{(I\text{-}2\text{-}P)} \tag{5}$$

where $\nu_{(I\text{-}2\text{-}N)}$: Abbé number of the negative lens element in the sub-group I-2; and $\nu_{(I\text{-}2\text{-}P)}$: Abbé number of the positive lens element in the sub-group I-2.

The lens system of the invention thus constructed has the advantage of reducing the aberrational changes that might occur during focusing for an object at near distance.

DESCRIPTION OF THE PREPARED EMBODIMENTS

Figure 1:
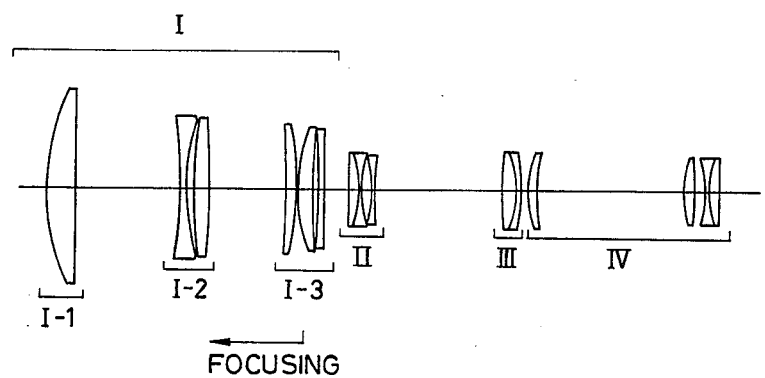
FIG. 1 is a simplified cross-sectional view of the zoom lens system of Example 1 for a focal length of 250 mm.
Figure 2:
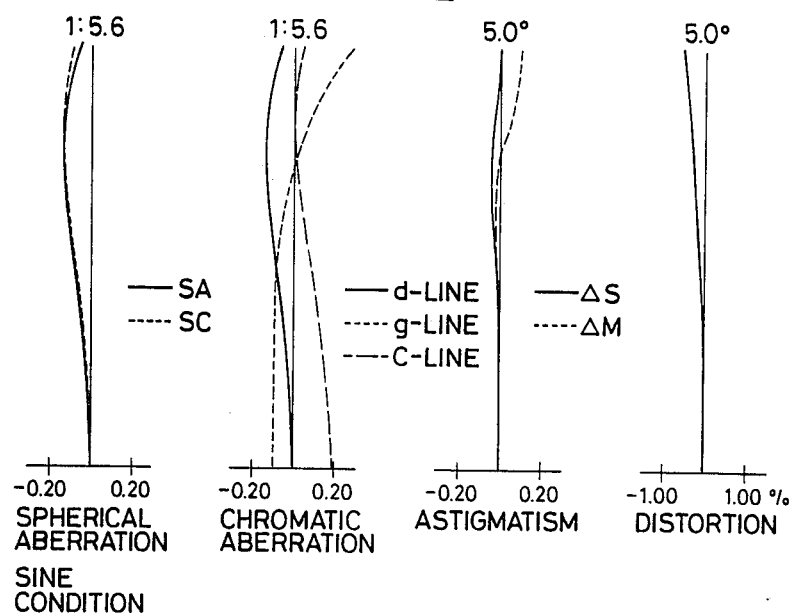
FIG. 2 is a graph showing aberrational curves obtained with the zoom lens system of Example 1 when the focal length is 250 mm.
Figure 3:
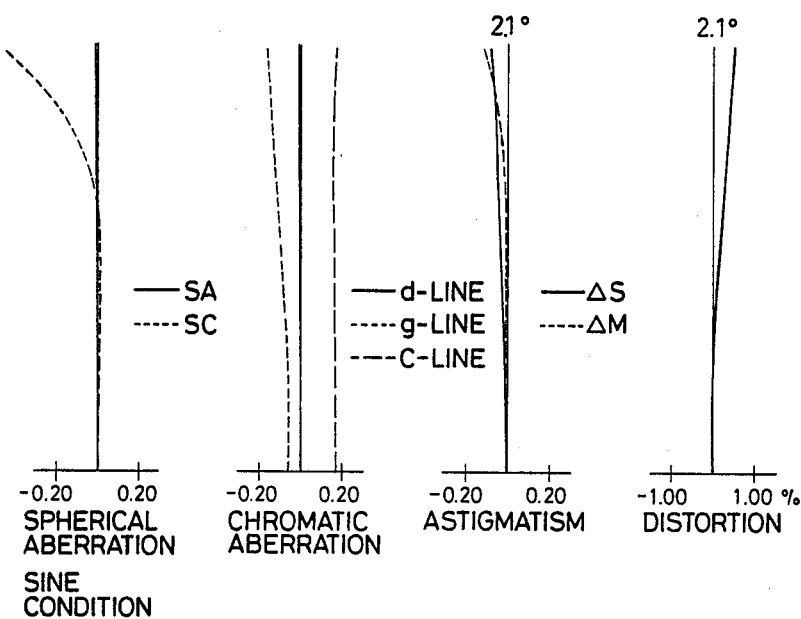
FIG. 3 is a graph showing aberrational curves obtained with the zoom lens system of Example 1 when the focal length is 600 mm.
Figure 4:
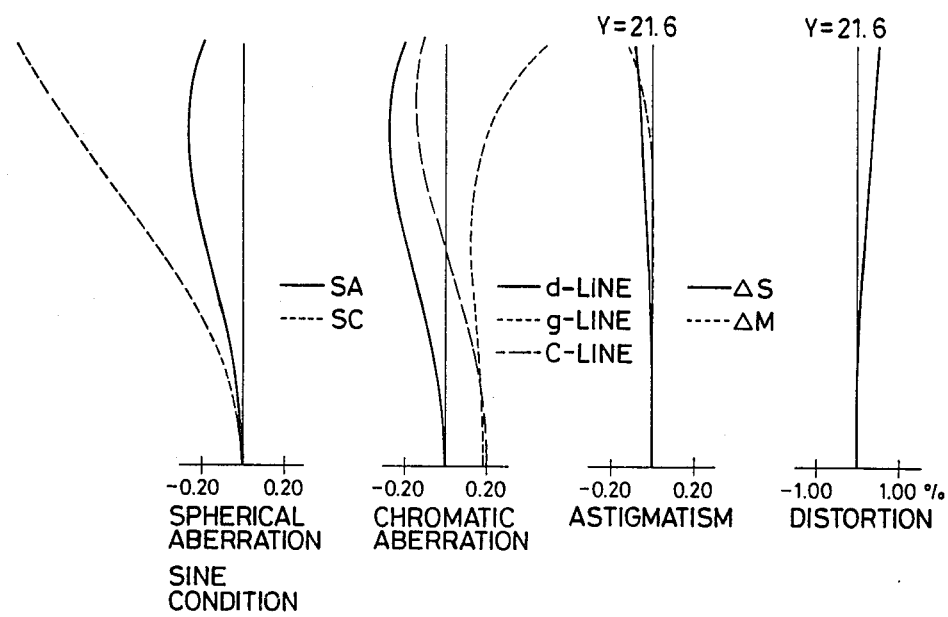
FIG. 4 is a graph showing aberrational curves obtained with the zoom lens system of Example 1 when focused on an object at a distance of 4 m from the lens where the focal length is 600 mm.
Figure 5:
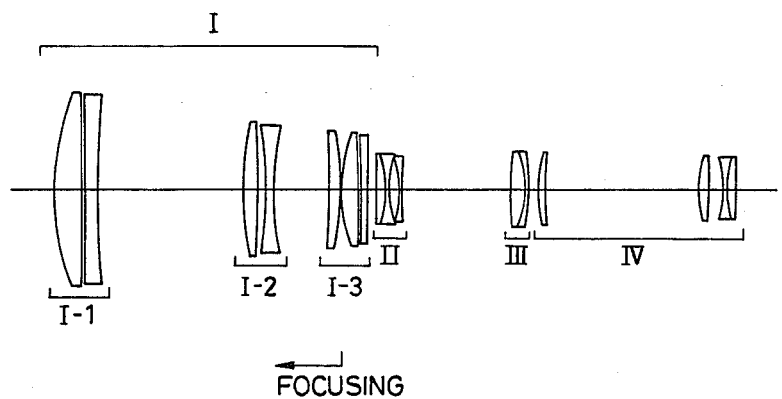
FIG. 5 is a simplified cross-sectional view of the zoom lens system of Example 2 for a focal length of 250 mm.
Figure 6:
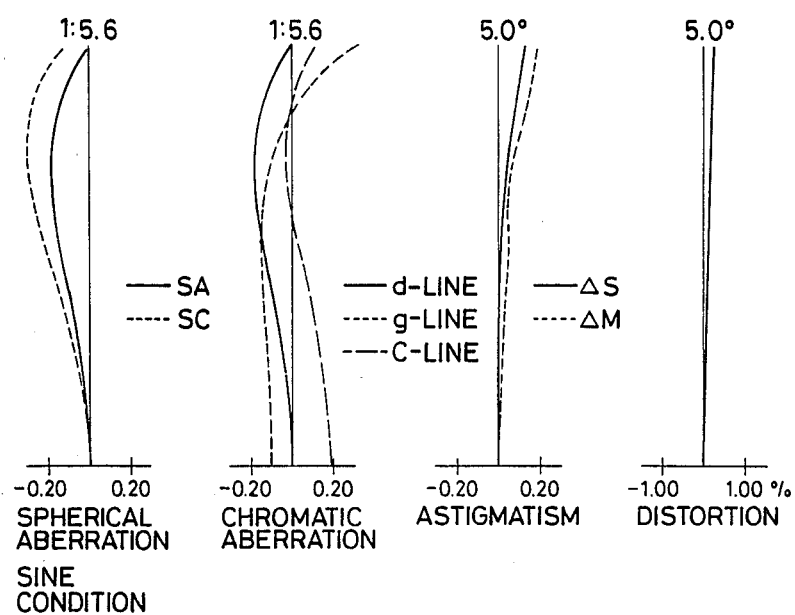
FIG. 6 is a graph showing aberrational curves obtained with the zoom lens system of Example 2 when the focal length is 250 mm.
Figure 7:
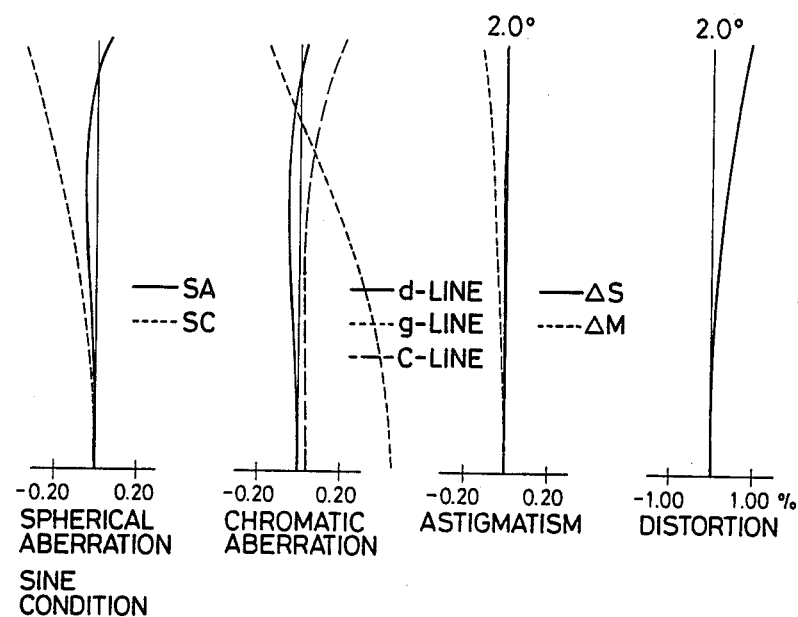
FIG. 7 is a graph showing aberrational curves obtained with the zoom lens system of Example 2 when the focal length is 600 mm.
Figure 8:
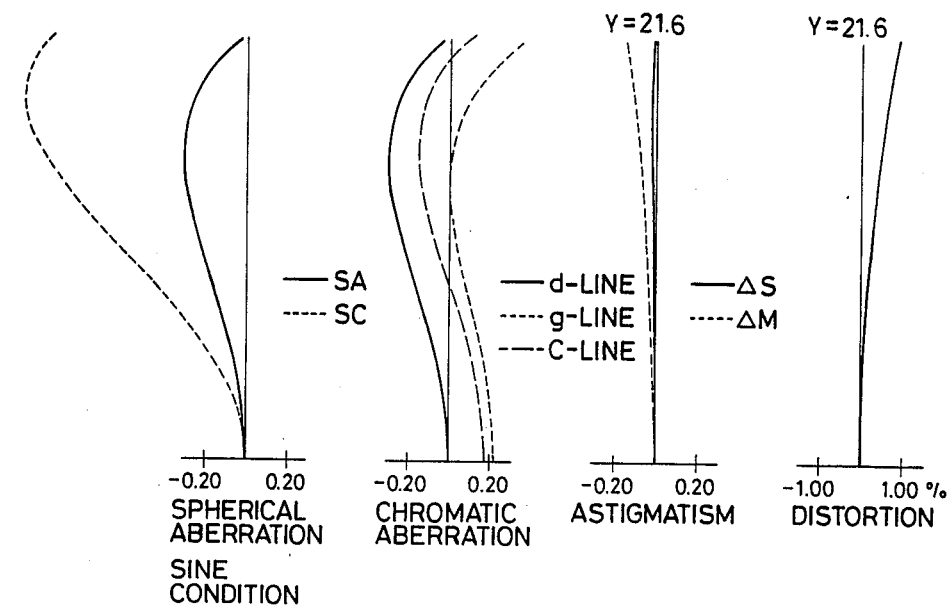
FIG. 8 is a graph showing aberrational curves obtained with the zoom lens system of Example 2 when focused on an object at a distance of 3.5 mm in the case where the focal length is 600 mm.
Figure 9:
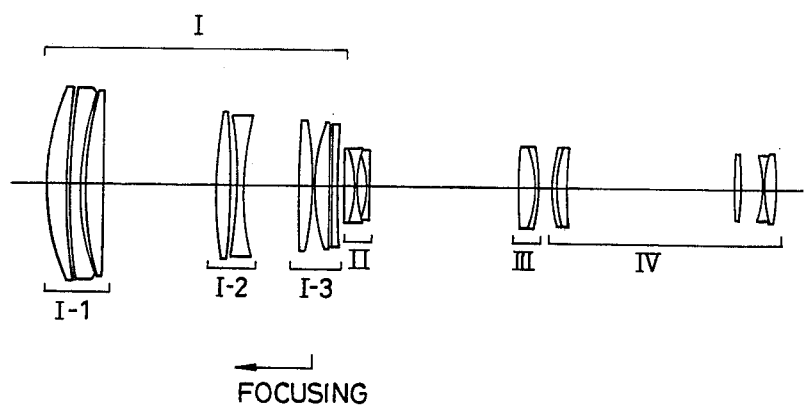
FIG. 9 is a simplified cross-sectional view of the zoom lens system of Example 3 for a focal length of 200 mm.
Figure 10:
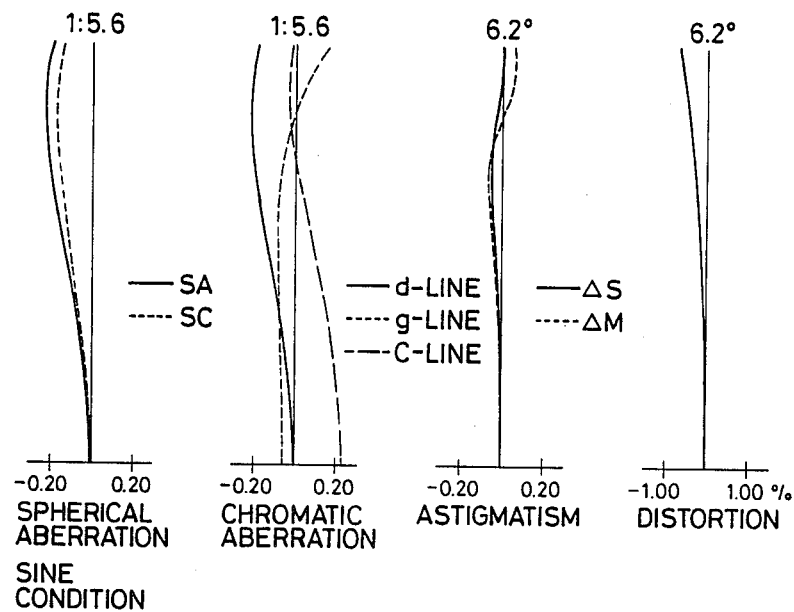
FIG. 10 is a graph showing aberrational curves obtained with the zoom lens system of Example 3 when the focal length is 200 mm.
Figure 11:
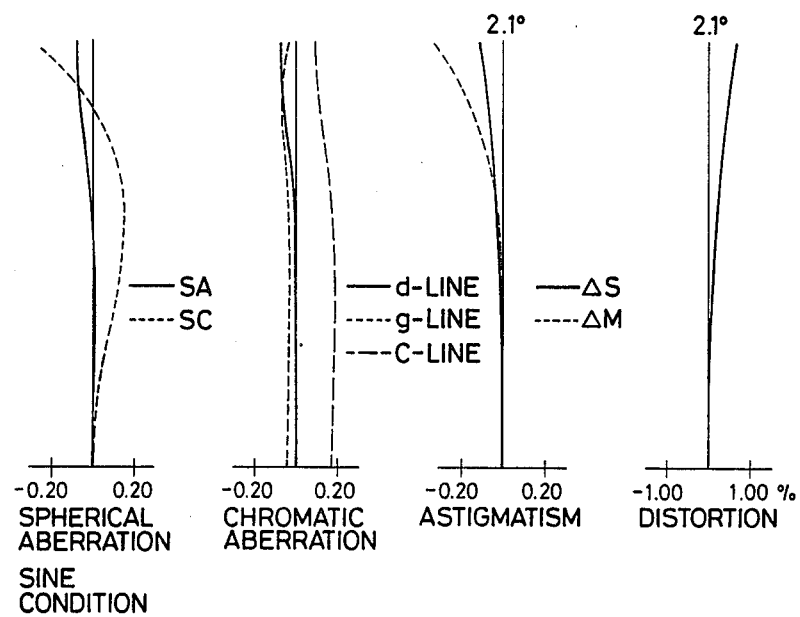
FIG. 11 is a graph showing aberrational curves obtained with the zoom lens system shown in Example 3 when the focal length is 600 mm.
Figure 12:
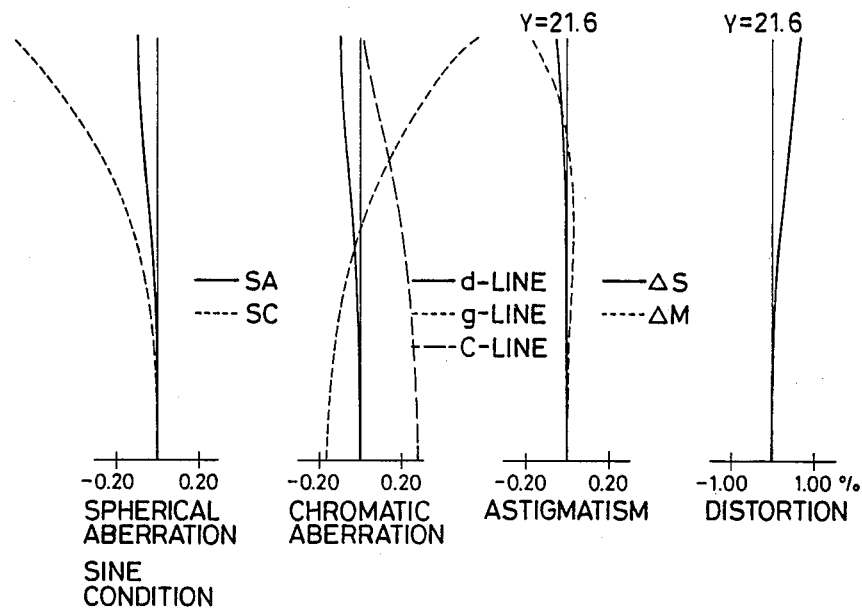
FIG. 12 is a graph showing aberrational curves obtained with the zoom lens system shown in Example 3 when focused on an object at a distance of 4 m in the case where the focal length is 600 mm.
Figure 13:
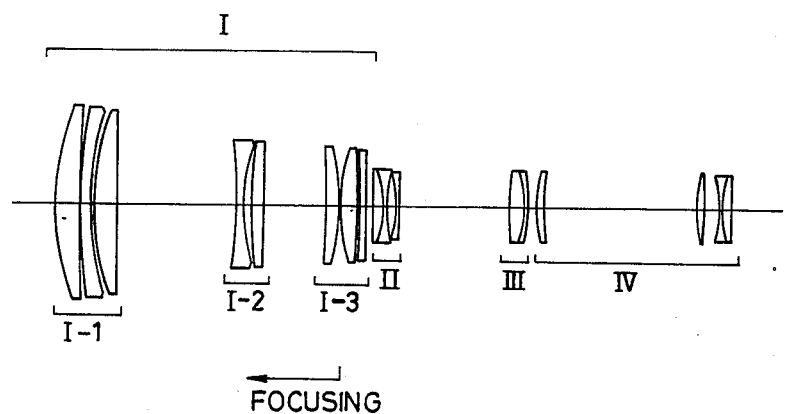
FIG. 13 is a simplified cross-sectional view of the zoom lens system of Example 4 when the focal length is 250 mm.
Figure 14:
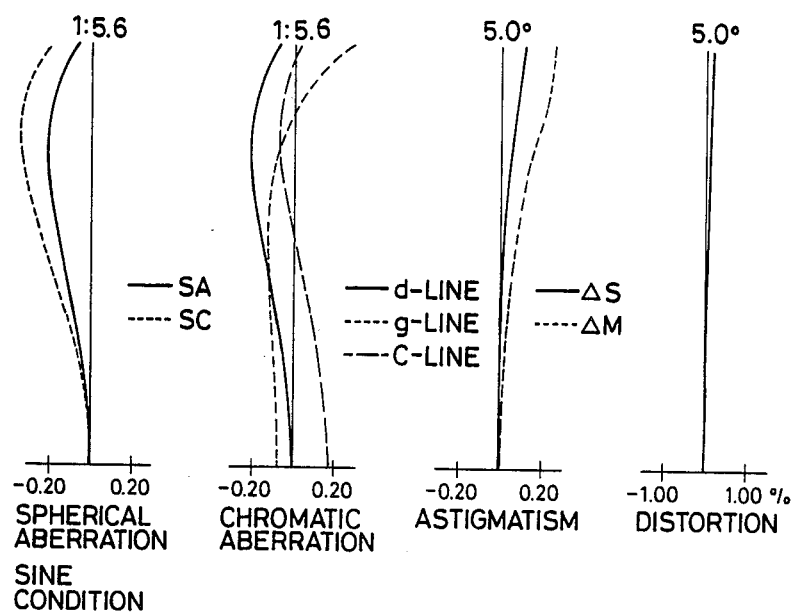
FIG. 14 is a graph showing aberrational curves obtained with the zoom lens system of Example 4 where the focal length is 250 mm.
Figure 15:
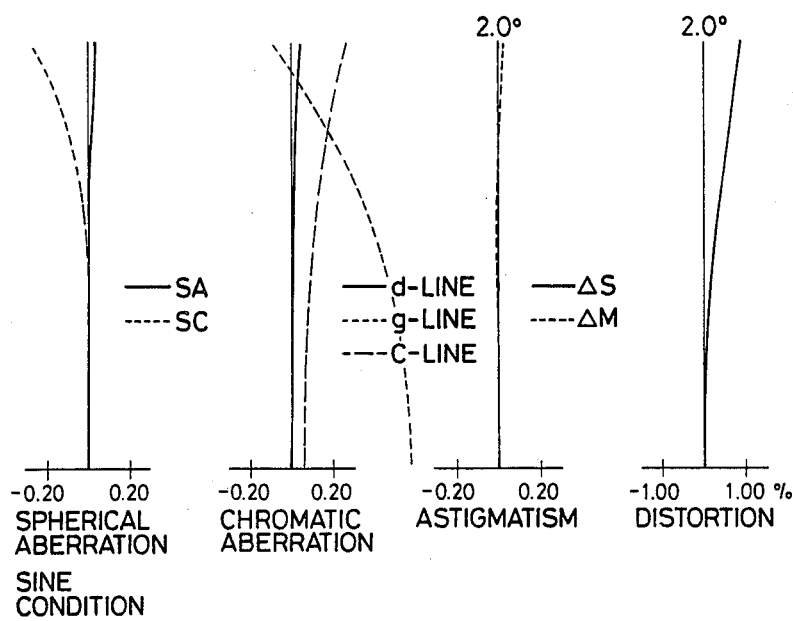
FIG. 15 is a graph showing aberrational curves obtained with the zoom lens system of Example 4 when the focal length is 600 mm.
Figure 16:
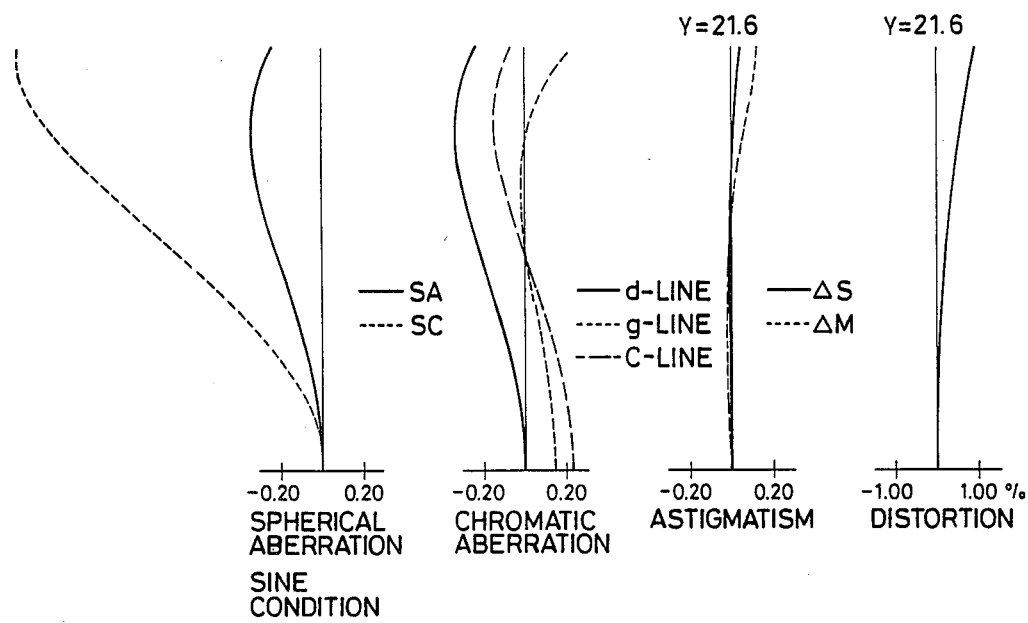
FIG. 16 is a graph showing aberrational curves obtained with the zoom lens system of Example 4 when focused on an object at a distance of 3 m in the case where the focal length is 600 mm.
Figure 17:
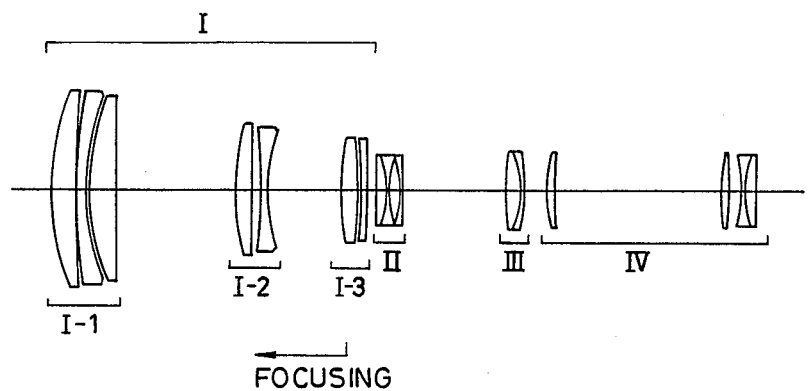
FIG. 17 is a simplified cross-sectional view of the zoom lens system of Example 5 when the focal length is 300 mm.
Figure 18:
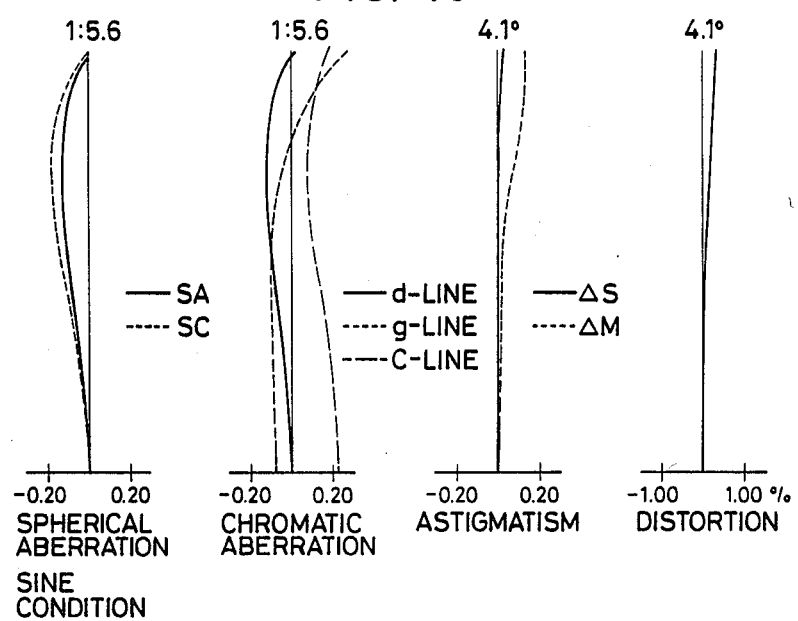
FIG. 18 is a graph showing aberrational curves obtained with the zoom lens system of Example 5 when the focal length is 300 mm.
Figure 19:
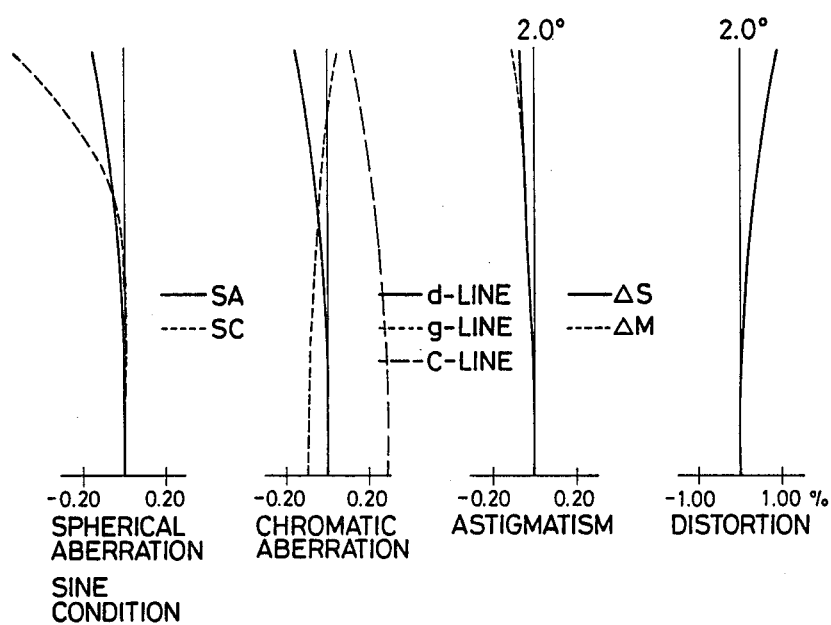
FIG. 19 is a graph showing aberrational curves obtained with the zoom lens system of Example 5 when the focal length is 600 mm.
Figure 20:
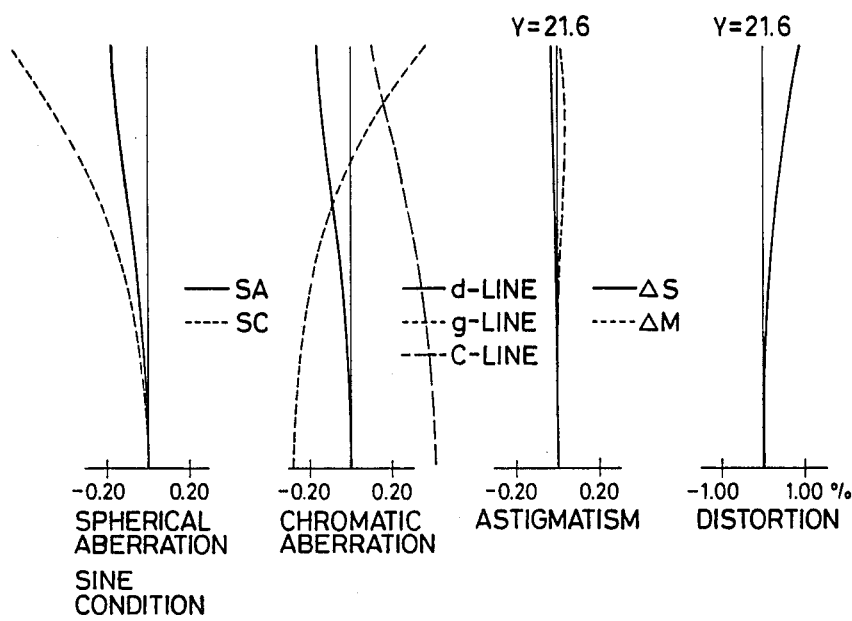
FIG. 20 is a graph showing aberrational curves obtained with the zoom lens system of Example 5 when focused on an object at a distance of 4 m in the case where the focal length is 600 mm.

Zoom lens systems that have large variations in their center of gravity during zooming are not suitable for use whether they are held by hand or supported on a tripod for shooting. Therefore, preferably the front lens group having the largest diameter should not move during zooming. To this end, the zoom lens system of the present invention employs a four-group composition and is designed to achieve zooming by moving the second and third lens groups, which do not undergo any substantial variations in their centers of gravity.

Moving the zooming mechanism unit during focusing is disadvantageous with respect to the weight of the focusing unit. Hence, the lens system of the present invention is designed to achieve focusing by moving a part of the first lens group (sub-group I-3) which is closer to the object side than the second and third lens groups, which are moved during zooming.

The composition of the sub-groups in the first lens group and conditions (1), (2) and (3) are necessary for reducing the size of the sub-group I-3 and for maintaining a high lens performance even when photographing an object at a near distance (finite distance).

By employing a sub-part I-1 with a positive refractive power and by increasing the distance between the sub-part I-1 and sub-group I-2, the height at which rays fall on the sub-group I-3 can be reduced and also the size of the sub-group can be reduced. Furthermore, by employing a sub-group I-2 with a negative refractive power, the sub-group I-3 can be controlled so that the height at which rays of light fall upon this sub-group does not greatly vary during movement of the sub-group.

Conditions (1) and (2) set forth the requirements that should be met in order to reduce the size of the sub-group I-3. If the sub-part I-1 is brought so close to the sub-group I-2 that the lower limit of condition (1) is not reached, the sub-part I-1 and I-2 will not be effective in reducing the height at which incident rays fall upon the sub-group I-3 unless the powers of both sub-part I-1 and sub-group I-2 are increased. In that case though the increase in the power of these sub-groups will give rise to chromatic differences in magnification (transversal chromatic aberration) and other aberrations to an extent that cannot be effectively compensated for by the rear lens group. If the upper limit of condition (1) is exceeded, the overall length of the lens system will increase.

If the lower limit of condition (2) is not reached, the quantity of marginal light will decrease while the chromatic difference of magnification will increase at the wide angle end. If the upper limit of condition (2) is exceeded, the size of the sub-group I-3 cannot be reduced.

Condition (3) should be fulfilled in order to restrict the spread of rays of light that fall on the sub-group I-3 and to limit the power of the sub-group I-2. If the lens elements up to the sub-group I-2 form an afocal system as represented by:

$$f_L/f_{(I\text{-}1, I\text{-}2)} = 0$$

the height at which rays of light fall on the sub-group I-3 will not change in response to its movement. In this case, it is easy to reduce the variations in spherical aberrations that might occur during focusing for an object at near distance. However, if compensation for chromatic and spherical aberrations is to be effected within the sub-group I-3, it is not absolutely necessary to ensure that $f_L/f_{(I\text{-}1, I\text{-}2)}$ is zero. If condition (3) is satisfied, the presence of a lens element in the sub-group I-3 that has a divergent concave surface on the object side enables reduction in the aberrational changes that might occur during focusing for an object at near distance.

If the upper limit of condition (3) is exceeded, the sub-group I-3, which is typically composed of two or three lens elements, is unable to prevent the occurrence of changes in spherical aberration during focusing for an object at near distance. If the lower limit of condition (3) is not reached, the diameter of the focusing lens unit would have to be increased. Another reason why it is preferable that the lower limit of condition (3) not be reached is that the negative power of the sub-group I-2 would then become stronger than is required for aberrational compensation.

In order to ensure that the sub-group I-3 attains achromatism while compensating for the changes in spherical aberration that might occur during focusing for an object at near distance, the sub-group I-3 desirably contains at least one negative lens element and at least one positive lens element while satisfying condition (4). Condition (4) is necessary for achieving achromatism within the sub-group I-3. If this condition is not met, an increased variation will occur in chromatic aberration as a result of focusing. If the negative lens element is disposed closest to the image side of the sub-group I-3 with its concave surface directed toward the object side, a large allowance is provided for the change in the height at which marginal rays fall on the divergent surface of said negative lens element when the system is focused for an object at near distance. This is effective in attaining sufficient overcompensation of spherical aberration to cancel any undercompensation of spherical aberration that might occur in the sub-part I-1 during focusing for an object at near distance.

If the sub-group I-2 has one positive lens element and one negative lens element having a concave surface on the object side, and if this sub-group satisfies condition (5), not only can the change in chromatic difference of magnification that might occur during zooming be reduced, but also the sub-group I-2 is provided with a capability for compensating for changes in spherical aberration that might otherwise occur during focusing for an object at near distance.

EXAMPLES

Five examples of telephoto zoom lens systems of the present invention are described in the following tables, in which $F_{NO}$ signifies the F number; f, the focal length; $\omega$, the half viewing angle; $f_B$, the back focus; r, the radius of curvature of an individual lens surface; d, lens thickness or aerial distance between lenses; N, the refractive index of an individual lens element at the d-line; and $\nu$, the Abbée number of an individual lens element.

| No. | r | d | N | $\nu$ |
|---|---|---|---|---|
| Example 1 | | | | |
| $F_{NO}$ = 1:5.6 | | f = 250 to 600 | | |
| $\omega$ = 5.0° to 2.1° | | $f_B$ = 119.93 | | |
| (Figures in brackets show lens-to-lens distances for f = 600 mm when the system is focused for an object 4 m distant.) | | | | |
| 1 | 125.090 | 17.00 | 1.49700 | 81.6 |
| 2 | −2186.645 | 58.64 | | |
| 3 | −265.884 | 4.20 | 1.78590 | 44.2 |
| 4 | 151.413 | 4.00 | | |
| 5 | 270.150 | 8.80 | 1.61405 | 55.0 |
| 6 | −371.024 | 43.34 | (28.90) | |
| 7 | −547.633 | 6.60 | 1.49700 | 81.6 |
| 8 | −153.955 | 0.10 | | |
| 9 | 96.468 | 9.00 | 1.49700 | 81.6 |
| 10 | 746.572 | 2.70 | | |
| 11 | −344.092 | 3.60 | 1.67270 | 32.1 |
| 12 | −4821.950 | 13.48~46.19 | (60.63) | |
| 13 | −2988.316 | 5.60 | 1.80518 | 25.4 |
| 14 | −71.945 | 2.30 | 1.67000 | 57.4 |
| 15 | 71.279 | 4.90 | | |
| 16 | −70.057 | 2.10 | 1.72916 | 54.7 |
| 17 | 999.174 | 70.76~2.98 | (2.98) | |
| 18 | 202.833 | 8.60 | 1.48749 | 70.2 |
| 19 | −49.105 | 2.40 | 1.68893 | 31.1 |
| 20 | −96.383 | 4.00~39.06 | (39.06) | |
| 21 | 60.022 | 4.70 | 1.49700 | 81.6 |
| 22 | 117.003 | 83.58 | | |
| 23 | 76.268 | 5.20 | 1.57099 | 50.8 |
| 24 | −180.856 | 5.96 | | |
| 25 | −68.810 | 1.80 | 1.79952 | 42.2 |
| 26 | 63.995 | 1.50 | | |
| 27 | 60.605 | 5.20 | 1.63636 | 35.4 |
| 28 | −281.319 | | | |

$d_{(I\text{-}1, I\text{-}2)}/f_L = 0.0977$
$h_{I\text{-}2}/h_{I\text{-}1} = 0.709$
$f_L/f_{(I\text{-}1, I\text{-}2)} = 0.737$
$\nu_{(I\text{-}3\text{-}N)} - \nu_{(I\text{-}3\text{-}P)} = -49.5$
$\nu_{(I\text{-}2\text{-}N)} - \nu_{(I\text{-}2\text{-}P)} = 10.8$

| | | Example 2 | | |
|---|---|---|---|---|
| $F_{NO}$ = 1:5.6 | | f = 250 to 600 | | |
| $\omega$ = 5.0° to 2.0° | | $f_B$ = 89.46 | | |
| (Figures in brackets show lens-to-lens distances for f = 600 mm when the system is focused for an object 3.5 m distant.) | | | | |
| 1 | 136.396 | 16.80 | 1.49700 | 81.6 |
| 2 | −1499.230 | 0.50 | | |
| 3 | 1440.292 | 7.78 | 1.80518 | 25.4 |
| 4 | 467.438 | 81.93 | | |
| 5 | 146.156 | 9.20 | 1.60562 | 43.7 |
| 6 | −889.163 | 4.10 | | |
| 7 | −281.857 | 4.20 | 1.77250 | 49.6 |
| 8 | 143.061 | 32.13 | (14.89) | |
| 9 | −816.826 | 6.80 | 1.49700 | 81.6 |
| 10 | −153.193 | 0.10 | | |
| 11 | 91.894 | 9.40 | 1.49700 | 81.6 |
| 12 | 873.484 | 2.10 | | |
| 13 | −360.342 | 3.60 | 1.68893 | 31.1 |
| 14 | −18307.897 | 5.00~38.80 | (56.04) | |
| 15 | −836.345 | 5.50 | 1.80518 | 25.4 |
| 16 | −57.600 | 2.30 | 1.69680 | 55.5 |
| 17 | 74.710 | 4.90 | | |
| 18 | −66.791 | 2.10 | 1.72916 | 54.7 |
| 19 | 1199.709 | 60.41~2.99 | (2.99) | |
| 20 | 157.497 | 8.30 | 1.48749 | 70.2 |
| 21 | −45.762 | 2.40 | 1.68893 | 31.1 |
| 22 | −88.720 | 4.44~28.07 | (28.07) | |
| 23 | 69.270 | 4.70 | 1.49700 | 81.6 |
| 24 | 199.559 | 87.90 | | |
| 25 | 76.572 | 4.90 | 1.62230 | 53.2 |
| 26 | −309.477 | 7.90 | | |
| 27 | −67.528 | 1.80 | 1.79952 | 42.2 |
| 28 | 65.922 | 0.60 | | |
| 29 | 59.926 | 5.00 | 1.63980 | 34.5 |
| 30 | −1355.890 | | | |

$d_{(I\text{-}1, I\text{-}2)}/f_L = 0.1365$
$h_{I\text{-}2}/h_{I\text{-}1} = 0.702$
$f_L/f_{(I\text{-}1, I\text{-}2)} = 0.641$
$\nu_{(I\text{-}3\text{-}N)} - \nu_{(I\text{-}3\text{-}P)} = -50.5$
$\nu_{(I\text{-}2\text{-}N)} - \nu_{(I\text{-}2\text{-}P)} = 5.9$

| | | Example 3 | | |
|---|---|---|---|---|
| $F_{NO}$ = 1:5.6 | | f = 200 to 600 | | |
| $\omega$ = 6.2° to 2.1° | | $f_B$ = 87.01 | | |
| (Figures in brackets show lens-to-lens distances for f = 600 mm when the system is focused for an object 4 m distant.) | | | | |
| 1 | 129.623 | 11.50 | 1.48749 | 70.2 |
| 2 | 372.429 | 2.50 | | |
| 3 | 432.073 | 5.30 | 1.64769 | 33.8 |
| 4 | 162.144 | 3.00 | | |
| 5 | 191.984 | 10.60 | 1.49700 | 81.6 |
| 6 | −2433.363 | 63.58 | | |
| 7 | 225.527 | 8.70 | 1.68893 | 31.1 |
| 8 | −426.910 | 3.70 | | |

-continued

| No. | r | d | N | ν |
|---|---|---|---|---|
| 9 | −243.039 | 4.00 | 1.78590 | 44.2 |
| 10 | 176.697 | 30.76 | (15.01) | |
| 11 | 896.879 | 7.90 | 1.49700 | 81.6 |
| 12 | −182.789 | 0.10 | | |
| 13 | 99.405 | 8.70 | 1.49700 | 81.6 |
| 14 | 535.160 | 1.80 | | |
| 15 | −880.520 | 3.50 | 1.71736 | 29.5 |
| 16 | 473.064 | 3.55~52.09 | (67.84) | |
| 17 | 8446.199 | 5.50 | 1.80518 | 25.4 |
| 18 | −65.876 | 2.00 | 1.69680 | 55.5 |
| 19 | 78.034 | 4.80 | | |
| 20 | −73.708 | 2.00 | 1.71300 | 53.8 |
| 21 | 651.228 | 83.20~0.93 | (0.93) | |
| 22 | 220.244 | 9.60 | 1.48749 | 70.2 |
| 23 | −50.803 | 2.30 | 1.68893 | 31.1 |
| 24 | −97.478 | 6.62 ~ 40.35 | (40.35) | |
| 25 | 70.505 | 2.80 | 1.62004 | 36.3 |
| 26 | 56.971 | 6.20 | 1.51633 | 64.1 |
| 27 | 219.459 | 94.31 | | |
| 28 | 286.021 | 3.80 | 1.69895 | 30.1 |
| 29 | −205.467 | 12.00 | | |
| 30 | −50.341 | 1.80 | 1.79952 | 42.2 |
| 31 | 274.219 | 0.98 | | |
| 32 | 100.666 | 5.90 | 1.56883 | 56.3 |
| 33 | −99.099 | | | |

$d_{(I\text{-}1, I\text{-}2)}/f_L = 0.1059$
$h_{I\text{-}2}/h_{I\text{-}1} = 0.756$
$f_L/f_{(I\text{-}1, I\text{-}2)} = 0.532$
$\nu_{(I\text{-}3\text{-}N)} - \nu_{(I\text{-}3\text{-}P)} = -52.1$
$\nu_{(I\text{-}2\text{-}N)} - \nu_{(I\text{-}2\text{-}P)} = 13.1$

Example 4

$F_{NO} = 1:5.6$  $f = 250$ to $600$
$\omega = 5.0°$ to $2.0°$  $f_B = 87.30$ (Figures in brackets show lens-to-lens distances for f = 600 mm when the system is focused for an object 3 m distant.)

| No. | r | d | N | ν |
|---|---|---|---|---|
| 1 | 142.892 | 14.00 | 1.48749 | 70.2 |
| 2 | 889.737 | 0.50 | | |
| 3 | 321.865 | 5.60 | 1.68893 | 31.1 |
| 4 | 155.622 | 2.40 | | |
| 5 | 137.792 | 13.10 | 1.49700 | 81.6 |
| 6 | 2243.061 | 67.90 | | |
| 7 | −282.635 | 4.20 | 1.77250 | 49.6 |
| 8 | 140.358 | 3.50 | | |
| 9 | 216.567 | 8.00 | 1.68893 | 31.1 |
| 10 | −1022.290 | 34.78 | (11.56) | |
| 11 | −493.685 | 6.80 | 1.49700 | 81.6 |
| 12 | −152.657 | 0.10 | | |
| 13 | 96.269 | 9.70 | 1.49700 | 81.6 |
| 14 | 3071.999 | 2.10 | | |
| 15 | −340.351 | 3.60 | 1.68893 | 31.1 |
| 16 | 3882.868 | 4.00~39.95 | (63.17) | |
| 17 | −5180.327 | 5.40 | 1.80518 | 25.4 |
| 18 | −64.294 | 2.30 | 1.69680 | 55.5 |
| 19 | 74.441 | 4.80 | | |
| 20 | −67.581 | 2.10 | 1.72916 | 54.7 |
| 21 | 6659.197 | 61.78 ~ 0.98 | (0.98) | |
| 22 | 155.984 | 8.20 | 1.48749 | 70.2 |
| 23 | −46.078 | 2.40 | 1.68893 | 31.1 |
| 24 | −89.421 | 4.28~29.13 | (29.13) | |
| 25 | 66.696 | 4.70 | 1.49700 | 81.6 |
| 26 | 167.342 | 85.92 | | |
| 27 | 78.159 | 4.80 | 1.61484 | 51.2 |
| 28 | −191.355 | 8.00 | | |
| 29 | −62.590 | 1.80 | 1.79952 | 42.2 |
| 30 | 63.565 | 0.30 | | |
| 31 | 55.289 | 5.00 | 1.62588 | 35.7 |
| 32 | 2697.022 | | | |

$d_{(I\text{-}1, I\text{-}2)}/f_L = 0.1131$
$h_{I\text{-}2}/h_{I\text{-}1} = 0.643$
$f_L/f_{(I\text{-}1, I\text{-}2)} = 0.702$
$\nu_{(I\text{-}3\text{-}N)} - \nu_{(I\text{-}3\text{-}P)} = -50.5$
$\nu_{(I\text{-}2\text{-}N)} - \nu_{(I\text{-}2\text{-}P)} = 18.5$

Example 5

$F_{NO} = 1:5.6$  $f = 300$ to $600$
$\omega = 4.1°$ to $2.0°$  $f_B = 100.39$ (Figures in brackets show lens-to-lens distances for f = 600 mm when the system is focused for an object 4 m distant.)

-continued

| No. | r | d | N | ν |
|---|---|---|---|---|
| 1 | 138.775 | 14.00 | 1.48749 | 70.2 |
| 2 | 784.621 | 0.50 | | |
| 3 | 342.686 | 5.60 | 1.68893 | 31.1 |
| 4 | 146.875 | 2.40 | | |
| 5 | 145.130 | 14.00 | 1.49700 | 81.6 |
| 6 | 2151.894 | 68.03 | | |
| 7 | 132.567 | 9.60 | 1.71736 | 29.5 |
| 8 | 4295.773 | 4.25 | | |
| 9 | −396.220 | 4.20 | 1.78590 | 44.2 |
| 10 | 108.605 | 41.17 | (13.51) | |
| 11 | 137.315 | 9.80 | 1.49700 | 81.6 |
| 12 | −280.896 | 2.10 | | |
| 13 | −267.788 | 3.60 | 1.72825 | 28.5 |
| 14 | −651.811 | 5.02~40.19 | (67.85) | |
| 15 | −418.335 | 5.40 | 1.80518 | 25.4 |
| 16 | −62.744 | 2.30 | 1.69680 | 55.5 |
| 17 | 81.108 | 4.80 | | |
| 18 | −74.206 | 2.10 | 1.72916 | 54.7 |
| 19 | −293.727 | 58.67~6.29 | (6.29) | |
| 20 | 195.270 | 8.00 | 1.48749 | 70.2 |
| 21 | −49.418 | 2.40 | 1.68893 | 31.1 |
| 22 | −96.555 | 12.09~29.30 | (29.30) | |
| 23 | 69.172 | 4.70 | 1.49700 | 81.6 |
| 24 | 172.356 | 93.23 | | |
| 25 | 93.002 | 5.00 | 1.59551 | 39.2 |
| 26 | −174.519 | 7.36 | | |
| 27 | −65.696 | 1.70 | 1.72342 | 38.0 |
| 28 | 63.366 | 0.69 | | |
| 29 | 58.022 | 5.20 | 1.60342 | 38.0 |
| 30 | −933.936 | | | |

$d_{(I\text{-}1, I\text{-}2)}/f_L = 0.1133$
$h_{I\text{-}2}/h_{I\text{-}1} = 0.680$
$f_L/f_{(I\text{-}1, I\text{-}2)} = 0.887$
$\nu_{(I\text{-}3\text{-}N)} - \nu_{(I\text{-}3\text{-}P)} = -55.1$
$\nu_{(I\text{-}2\text{-}N)} - \nu_{(I\text{-}2\text{-}P)} = 14.7$ As described above, the four-group type telephoto zoom lens system of the present invention, which includes a super-telephoto range, achieves zooming by moving the second and third lens groups and performs focusing by moving part of the first lens group (i.e., the sub-group I-3). In addition, by satisfying conditions (1) to (3), the size of the focusing lens unit (sub-group I-3) can be reduced and the lens unit that is moved to achieve focusing made light in weight. The zoom lens system of the present invention can easily be adapted for auto-focusing with a motor, and it ensures good performance even in the case of photographing an object at near distance.

The reduction in the size of the focusing lens unit is accompanied by the additional advantage of a smaller effective aperture in both the variator (second lens group) and the compensator (third lens group). As already mentioned, another feature of the zoom lens system of the present invention is that the focusing lens unit is moved independently of the zooming lens unit. Because of these advantages, the zoom lens system can be used to advantage in a power zooming method which achieves zooming with a built-in motor.

The use of independent machanisms for achieving focusing and zooming has the additional advantage of a reduced complexity in the construction of the lens barrel.

If the sub-groups I-2 and I-3 satisfy conditions (4) and (5), still another advantage results in that the variations in chromatic aberration can be appreciably reduced.

I claim:

1. A telephoto zoom lens system comprising: four lens groups comprising, in order from the object side, of a first group having a positive refractive power and comprising a first sub-part I-1 having a positive refractive power, a second sub-group I-2 having a negative refractive power, and a third sub-group I-3 having a positive refractive power, a second group having a negative refractive power, a third group having a positive refractive power, and a fourth group having a positive refractive power, said lens system achieving zooming by moving the second lens group, which is chiefly responsible for varying magnification, and the third lens group, which has an image position correcting capability, along the optical axis of said lens system, said system achieving focusing when photographing an object at a finite distance by moving only the sub-group I-3 toward the object side, and said lens system further satisfying the following conditions:

(1) $0.08 < d_{(I\text{-}1, I\text{-}2)}/f_L < 0.16$;
(2) $0.5 < h_{I\text{-}2}/h_{I\text{-}1} < 0.8$; and
(3) $0.3 < f_L/f_{(I\text{-}1, I\text{-}2)} < 1.0$ where $f_L$: focal length of the overall system at the narrow-angle end;

$d_{(I\text{-}1, I\text{-}2)}$: distance between said sub-part I-1 and sub-group I-2;

$h_{I\text{-}1}$: height of paraxial rays from an object at infinity to said sub-part I-1 paraxially at an incident angle of 0°;

$h_{I\text{-}2}$: height of the paraxial rays from an object at infinity to said sub-group I-2 paraxially; and $f_{(I\text{-}1, I\text{-}2)}$: composite focal length of said sub-part I-1 and sub-group I-2.

2. The telephoto zoom lens system according to claim 1, wherein said sub-group I-3 comprises at least one positive lens element and at least one negative lens element, and said sub-group I-3 satisfies the following condition:

$$\nu_{(I\text{-}3\text{-}N)} - \nu_{(I\text{-}3\text{-}P)} < -40 \qquad (4)$$

where $\nu_{(I\text{-}3\text{-}N)}$: average of Abbé numbers of said negative lens elements in said sub-group I-3; and $\nu_{(I\text{-}3\text{-}P)}$: average of Abbé numbers of said positive lens elements in said sub-group I-3.

3. The telephoto zoom lens system according to claim 1, wherein said sub-group I-2 comprises one negative lens element having a concave surface on the object side and one positive lens element and satisfies the following condition:

$$5 < \nu_{(I\text{-}2\text{-}N)} - \nu_{(I\text{-}2\text{-}P)} \qquad (5)$$

where $\nu_{(I\text{-}2\text{-}N)}$: Abbé number of the negative lens element in the sub-group I-2; and $\nu_{(I\text{-}2\text{-}P)}$: Abbé number of the positive lens element in the sub-group I-2.

* * * * *